(12) United States Patent
Wang

(10) Patent No.: US 10,003,297 B2
(45) Date of Patent: Jun. 19, 2018

(54) DRIVE CIRCUIT AND SEMICONDUCTOR APPARATUS FOR A HIGH OUTPUT MOTOR

(71) Applicant: Kabushiki Kaisha Toshiba, Minato-ku, Tokyo (JP)

(72) Inventor: Shen Wang, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/260,632

(22) Filed: Sep. 9, 2016

(65) Prior Publication Data

US 2017/0244352 A1      Aug. 24, 2017

Related U.S. Application Data

(60) Provisional application No. 62/297,231, filed on Feb. 19, 2016.

(51) Int. Cl.
| | |
|---|---|
| H02P 1/04 | (2006.01) |
| H02P 3/00 | (2006.01) |
| H02P 7/00 | (2016.01) |
| G05B 5/00 | (2006.01) |
| H02H 7/08 | (2006.01) |
| H02P 29/40 | (2016.01) |
| H02P 27/08 | (2006.01) |
| H02P 6/14 | (2016.01) |

(52) U.S. Cl.
CPC .............. *H02P 29/40* (2016.02); *H02P 6/14* (2013.01); *H02P 27/08* (2013.01)

(58) Field of Classification Search
CPC ............. H02P 29/40; H02P 6/14; H02P 27/08
USPC ......................................................... 318/476
See application file for complete search history.

(56) References Cited

U.S. PATENT DOCUMENTS

| | | | | |
|---|---|---|---|---|
| 5,724,235 | A * | 3/1998 | Shimamori | H02M 3/33592 363/21.06 |
| 8,593,100 | B2 | 11/2013 | Nakahata et al. | |
| 2004/0178759 | A1* | 9/2004 | Nakamura | B60H 1/00828 318/471 |
| 2013/0082627 | A1* | 4/2013 | Ichikawa | H02P 6/00 318/139 |
| 2013/0147414 | A1* | 6/2013 | Jang | H02P 27/08 318/519 |
| 2014/0159627 | A1* | 6/2014 | Lee | H02P 29/027 318/400.22 |

FOREIGN PATENT DOCUMENTS

| | | |
|---|---|---|
| JP | 3285717 B2 | 5/2002 |
| JP | 2015-142432 A | 8/2015 |

* cited by examiner

*Primary Examiner* — Erick Glass
(74) *Attorney, Agent, or Firm* — White & Case LLP

(57) ABSTRACT

According to embodiments, a drive circuit includes a control portion configured to, when a duty ratio is set to a first predetermined value, and a load apparatus is in an overload state, set the duty ratio to a second predetermined value smaller than the first predetermined value during a predetermined time period.

10 Claims, 6 Drawing Sheets

DRIVE CIRCUIT AND SEMICONDUCTOR APPARATUS FOR A HIGH OUTPUT MOTOR

CROSS-REFERENCE TO RELATED APPLICATIONS

This application is based upon and claims the benefit of priority from U.S. Provisional Application No. 62/297,231, filed on Feb. 19, 2016; the entire contents of which are incorporated herein by reference.

FIELD

Embodiments described herein relate generally to a drive circuit and a semiconductor apparatus.

BACKGROUND

Conventionally, there is a PWM control technique, for example, for a motor drive circuit. In the PWM control technique, a command voltage signal for commanding a duty ratio is inputted; an output PWM signal with a predetermined frequency is generated based on the command voltage signal; and a load apparatus is controlled by the output PWM signal.

In a drive circuit to which the PWM control technique is applied, especially in a drive circuit for driving a motor, when a coil current flowing through a coil of the motor exceeds a predetermined threshold, an internal PWM signal G is lowered from an H level to an L level to generate an output PWM signal so that an overload current does not flow through the motor.

However, in a conventional drive circuit, if the duty ratio is set to 100% in order to maximize output of a motor, the H level of the internal PWM signal is maintained until the coil current of the motor exceeds the predetermined threshold, and a frequency may be lower than the predetermined frequency.

When the frequency of the internal PWM signal becomes lower than the predetermined frequency, a frequency of the output PWM signal also becomes lower than the predetermined frequency. The motor driven by the output PWM signal having a lowered frequency may cause, for example, noise by an electromagnetic sound, or vibration, noise and the like by increase in a current ripple.

DETAILED DESCRIPTION

Drive circuits of embodiments have a control portion configured to, when a duty ratio is set to a first predetermined value, and a load apparatus is in an overload state, set the duty ratio to a second predetermined value smaller than the first predetermined value during a predetermined time period.

(First Embodiment)

A first embodiment will be described below with reference to drawings.

(Configuration)

Figure 1:
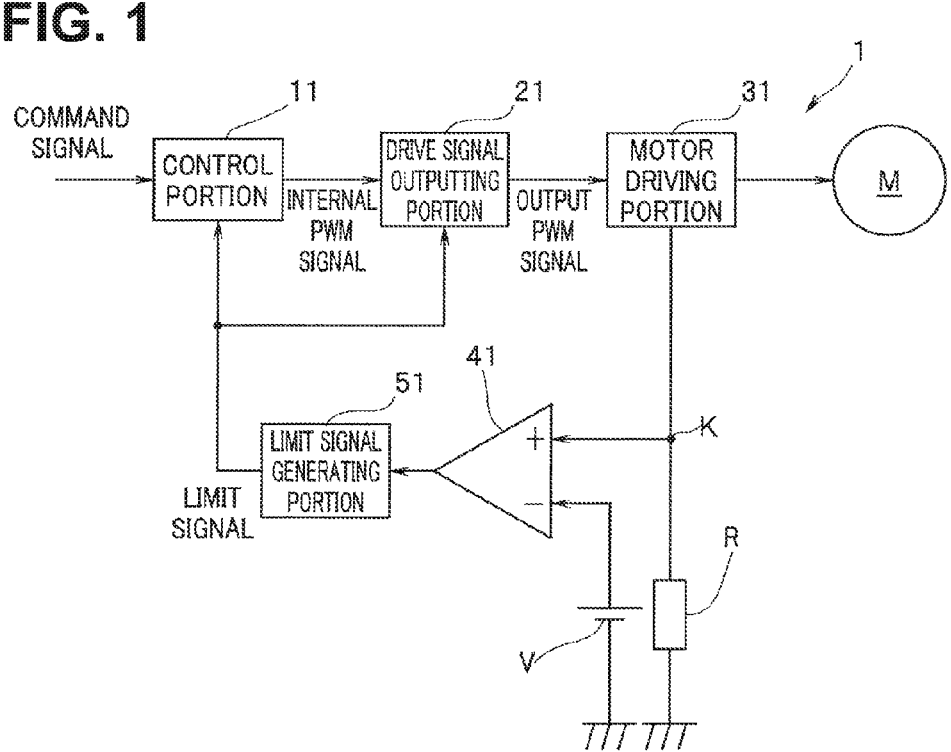
FIG. 1 is a block diagram showing a configuration of main portions of a drive circuit according to a first embodiment.
Figure 2:
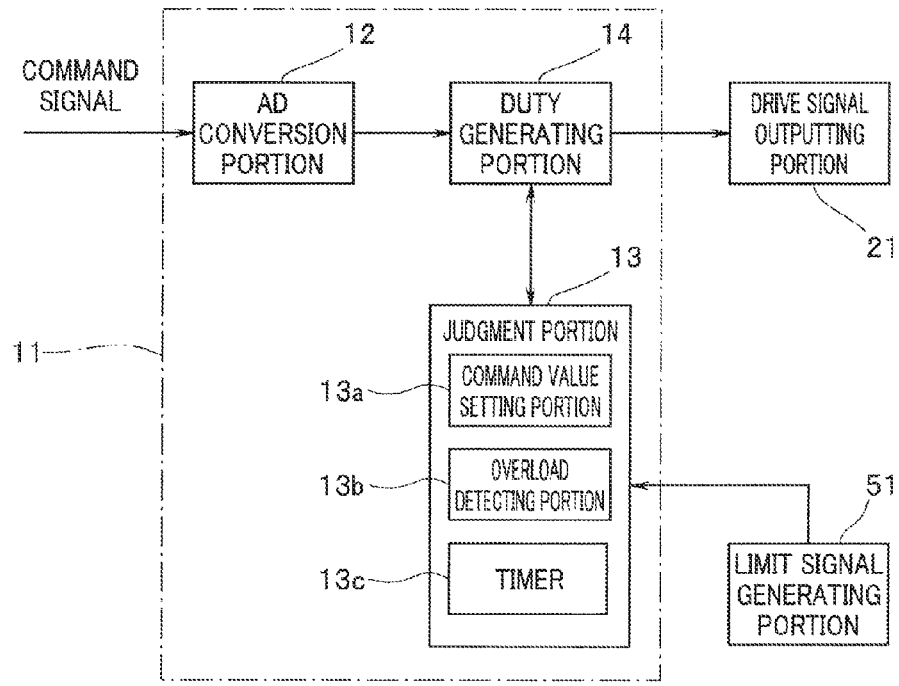
FIG. 2 is a block diagram showing a configuration of a control portion of the drive circuit according to the first embodiment.

FIG. 1 is a block diagram showing a configuration of main portions of a drive circuit 1 according to a first embodiment. FIG. 2 is a block diagram showing a configuration of a control portion 11 of the drive circuit 1 according to the first embodiment.

As shown in FIG. 1, the drive circuit 1 is configured with a semiconductor apparatus and has the control portion 11, a drive signal outputting portion 21, a motor driving portion 31 which is a load apparatus driving portion, a comparator 41 and a limit signal generating portion 51. A motor M, which is a load apparatus, is connected to the motor driving portion 31.

The control portion 11 is a circuit configured to set a duty ratio and generate an internal PWM signal G corresponding to the duty ratio. The control portion 11 is connected to the drive signal outputting portion 21. The control portion 11 is capable of outputting the internal PWM signal G to the drive signal outputting portion 21. The control portion 11 has an AD conversion portion 12, a judgment portion 13 and a duty generating portion 14.

A command signal is inputted to the control portion 11 so that a duty ratio corresponding to a voltage value can be set. The command signal may be a voltage signal, for example. A voltage width of the command signal, for example, from 0 V to 5 V is set in advance. For example, when the voltage width of the command signal is set from 0 V to 5 V, a command value for commanding a duty ratio for a command signal of 0 V is 0%, and a command value for commanding a duty ratio for a command signal of 5 V is 100%. Note that the command signal may be a PWM periodic signal. For example, when an input duty ratio defined by the PWM periodic signal is 0%, a command value is 0%, and when the input duty ratio is 100%, the command value is 100%.

The AD conversion portion 12 is a circuit configured to convert an inputted command signal to a digital signal. The AD conversion portion 12 is connected to the duty generating portion 14. The AD conversion portion 12 converts an inputted command signal to a digital signal and outputs the digital signal to the duty generating portion 14.

The judgment portion 13 is a circuit configured to perform judgment about duty ratio based on a duty ratio commanded by a command signal and a limit signal LS inputted from the limit signal generating portion 51 to set a duty ratio. The judgment portion 13 has a command value setting portion 13a, an overload detecting portion 13b and a timer 13c.

The command value setting portion 13a acquires a digitized command signal from the duty generating portion 14, reads a command value from the command signal and sets a duty ratio corresponding to the command value. That is, the command value setting portion 13a sets a duty ratio based on a command signal.

The overload detecting portion 13b detects whether the motor M, which is a load apparatus, is in an overload state. More specifically, the overload detecting portion 13b detects whether an overcurrent flows through a coil of the motor M based on the limit signal LS inputted from the limit signal generating portion 51 to be described later.

The timer 13c starts operation in response to an operation instruction of the judgment portion 13 and stops the operation after elapse of a predetermined time period T. A function of the timer 13c may be realized by counting pulses of the internal PWM signal G a predetermined number of times or may be realized by an internal clock not shown. For example, when a frequency of the internal PWM signal G is 20 KHz, the predetermined number of times is 2000. The judgment portion 13 can judge whether the predetermined time period T has elapsed or not by the timer 13c.

That is, when the duty ratio is set to a first predetermined value, and a load apparatus is in an overload state, the control portion 11 sets the duty ratio to a second predetermined value smaller than the first predetermined value during the predetermined time period T.

More specifically, when the duty ratio is set to the first predetermined value, and the limit signal LS is inputted from the limit signal generating portion 51, the control portion 11 sets the duty ratio to the second predetermined value and outputs the internal PWM signal G based on the duty ratio.

More specifically, when the duty ratio with the first predetermined value is set by the command value setting portion 13a, and the limit signal LS is detected by the overload detecting portion 13b, and the control portion 11 judges that an overcurrent flows through the coil of the motor M, the control portion 11 sets the duty ratio to the second predetermined value during the predetermined time period T by the timer 13c and outputs the set duty ratio to the duty generating portion 14.

The duty generating portion 14 is a circuit configured to generate an internal PWM signal G according to the duty ratio judged and set by the judgment portion 13. The duty generating portion 14 is connected to the drive signal outputting portion 21. The duty generating portion 14 generates an internal PWM signal G and outputs the internal PWM signal G to the drive signal outputting portion 21.

The frequency of the internal PWM signal G is set, for example, to a frequency higher than 20 KHz which is a human's audible range.

The drive signal outputting portion 21 is a circuit configured to output an output PWM signal to the motor driving portion 31 as a drive signal for driving the motor driving portion 31. The drive signal outputting portion 21 is connected to the control portion 11, the limit signal generating portion 51 and the motor driving portion 31. When a limit signal LS is inputted from the limit signal generating portion 51, the drive signal outputting portion 21 lowers the duty ratio of the internal PWM signal G to generate an output PWM signal and outputs the output PWM signal to the motor driving portion 31 so that an overcurrent does not flow through the coil of the motor M.

The motor driving portion 31 is a circuit configured to drive the motor M. The motor driving portion 31 is configured, for example, with a three-phase inverter circuit having an FET bridge with six FETs and the like. Each FET is provided with a reflux diode not shown. The motor driving portion 31 is connected to the motor M, the comparator 41 and a resistor R. The motor driving portion 31 drives gates of the FETs based on the output PWM signal inputted from the drive signal outputting portion 21, generates a three-phase coil current for driving the motor M and outputs the three-phase coil current to the motor M. The coil current outputted to the motor M is inputted to the motor driving portion 31 again via the coil in the motor M, which is not shown. The coil current inputted from the motor M is outputted to the comparator 41 and the resistor R. Note that the configuration of the motor driving portion 31 is not limited to the three-phase inverter circuit but may be other circuits, for example, an H bridge circuit with four FETs.

The motor M is configured, for example, with a brushless motor. The motor M is configured having a stator wound by a three-phase coil constituted by a U phase, a V phase and a W phase, which is not shown, and a rotor not shown.

The resistor R is arranged so as to be capable of measuring a coil current value of the motor M. One end of the resistor R is connected to the motor driving portion 31, and the other end is grounded. Voltage at a connection point K between the resistor R and the motor driving portion 31 is calculated by multiplying the coil current value of the motor M and a resistance value of the resistor R together. Since the resistance value of the resistor R is set in advance, the coil current value of the motor M can be calculated by the voltage at the connection point K.

The comparator 41 is a circuit configured to detect whether the coil current value of the motor M exceeds a predetermined threshold or not. A positive side input terminal of the comparator 41 is connected to the motor driving portion 31. A negative side input terminal of the comparator 41 is connected to a reference power source V. An output terminal of the comparator 41 is connected to the limit signal generating portion 51. When the coil current value is lower than the predetermined threshold, the voltage at the connection point K is lower than reference voltage inputted from the reference power source V, and the comparator 41 outputs an L-level comparator signal to the limit signal generating portion 51. When the coil current value is higher than the predetermined threshold, the voltage at the connection point K is higher than the reference voltage, and the comparator 41 outputs an H-level comparator signal to the limit signal generating portion 51.

The reference voltage of the reference power source V is set in advance so as to be lower than the voltage at the connection point K when the coil current value of the motor M exceeds the predetermined threshold.

The predetermined threshold is set in advance in accordance with a kind, performance, and the like of the motor M.

The limit signal generating portion 51 is a circuit configured to generate a limit signal LS based on an output signal of the comparator 41. The limit signal generating portion 51 is connected to the control portion 11 and the drive signal outputting portion 21. When a comparator signal inputted from the comparator 41 is an L-level signal, the limit signal generating portion 51 outputs an L-level signal. On the other hand, when the comparator signal inputted from the comparator 41 is an H-level signal, the limit signal generating portion 51 generates a limit signal LS, which is a pulse wave, and outputs the limit signal LS to the control portion 11 and the drive signal outputting portion 21.

That is, the limit signal generating portion 51 is connected to the motor driving portion 31 configured to drive the load apparatus, acquires a parameter value of the load apparatus from the motor driving portion 31, and, when the load apparatus is in an overload state and the parameter value outputted from the load apparatus exceeds a predetermined threshold, outputs a limit signal LS indicating that the load apparatus is in the overload state, to the control portion 11 and the drive signal outputting portion 21. More specifically, the limit signal generating portion 51 is connected to the motor driving portion 31 configured to drive the motor M, acquires the coil current value of the motor M from the motor driving portion 31, and, when the coil current value exceeds a predetermined threshold, outputs a limit signal LS to the control portion 11 and the drive signal outputting portion 21.

(Operation)

Next, a duty ratio setting flow of the drive circuit 1 of the first embodiment will be described.

Figure 3:
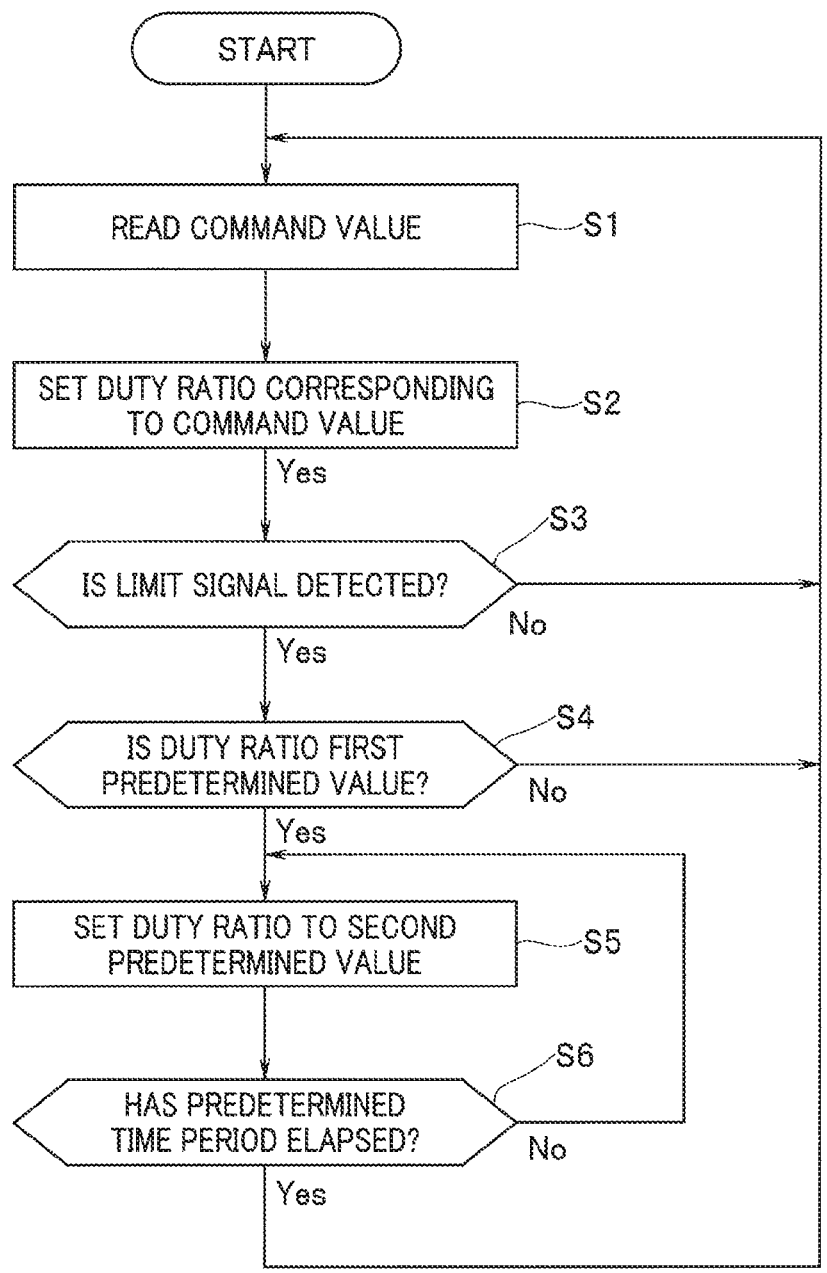
FIG. 3 is an explanatory diagram illustrating a duty ratio setting flow of the drive circuit according to the first embodiment.
Figure 4A:
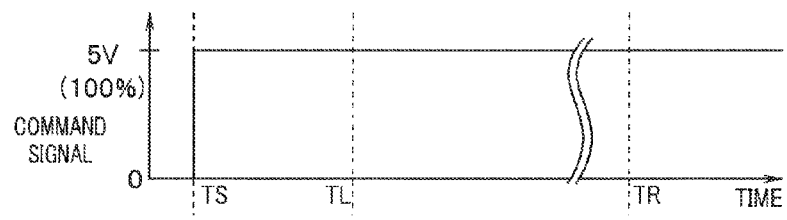
FIG. 4A is a timing chart showing an example of a command signal inputted to the drive circuit according to the first embodiment.
Figure 4B:
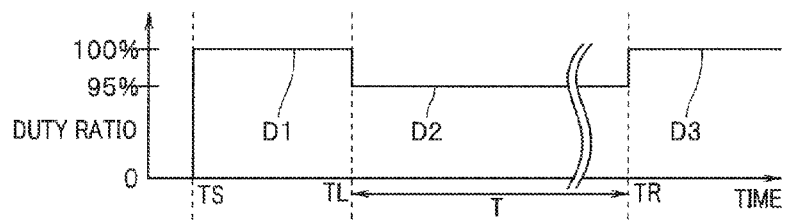
FIG. 4B is a timing chart illustrating an example of the duty ratio set by a judgment portion of the drive circuit according to the first embodiment.
Figure 4C:
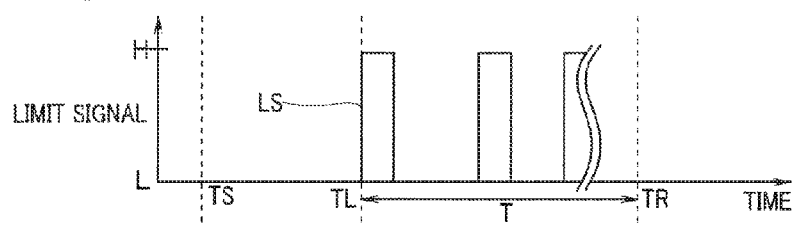
FIG. 4C is a timing chart illustrating an example of a limit signal outputted by a limit signal generating portion of the drive circuit according to the first embodiment.
Figure 4D:
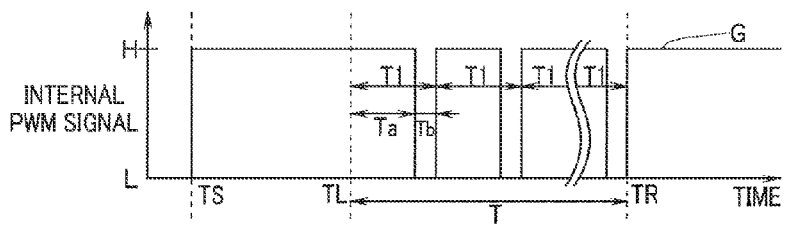
FIG. 4D is a timing chart illustrating an example of an internal PWM signal outputted by the control portion of the drive circuit according to the first embodiment.

FIG. 3 is an explanatory diagram illustrating the duty ratio setting flow of the drive circuit 1 according to the first embodiment. FIG. 4A is a timing chart showing an example of the command signal inputted to the drive circuit 1 according to the first embodiment. FIG. 4B is a timing chart illustrating an example of the duty ratio set by the judgment portion 13 of the drive circuit 1 according to the first embodiment. FIG. 4C is a timing chart illustrating an example of the limit signal LS outputted by the limit signal generating portion 51 of the drive circuit 1 according to the first embodiment. FIG. 4D is a timing chart illustrating an example of the internal PWM signal G outputted by the control portion 11 of the drive circuit 1 according to the first embodiment.

When a command signal is inputted to the control portion 11, the AD conversion portion 12 converts the command signal to a digital signal and outputs the digital signal to the duty generating portion 14. FIG. 4A is an example of starting input of a command signal 5V setting and commanding a duty ratio of 100% at time TS.

The judgment portion 13 reads a command value (step S1). At step S1, the judgment portion 13 acquires a digitized command signal from the duty generating portion 14 to read the command value.

The judgment portion 13 sets a duty ratio corresponding to the command value (step S2). In the example of FIG. 4B, the judgment portion 13 sets the duty ratio to 100% at the time TS (D1 in FIG. 4B).

The judgment portion 13 judges whether or not a limit signal LS is detected (step S3). At step S3, if the limit signal LS is detected, the process proceeds to step S4. On the other hand, if the limit signal LS is not detected, the process returns to step S1. In the example of FIG. 4C, a limit signal LS is detected at a time TL, and the process proceeds to step S4.

The judgment portion 13 judges whether the duty ratio is set to the first predetermined value or not (step S4). At step S4, if the duty ratio is set to the first predetermined value, the process proceeds to step S5. On the other hand, if the duty ratio is not set to the first predetermined value, the process returns to step S1. In the example of FIG. 4B, the first predetermined value is 100%. Therefore, if the duty ratio is set to 100%, the process proceeds to step S5.

The judgment portion 13 sets the duty ratio to the second predetermined value (step S5). In the example of step S5, the judgment portion 13 sets the duty ratio to the second predetermined value. In the example of FIG. 4B, the second predetermined value is 95%. Therefore, the judgment portion 13 sets the duty ratio to 95% at the time TL (D2 in FIG. 4B). In the judgment portion 13, the timer 13c starts operation if the timer 13c is not operating.

The judgment portion 13 judges whether the predetermined time period T of the timer 13c has elapsed or not (step S6). If the predetermined time period T has elapsed after the timer 13c started operation, the process returns to step S1. On the other hand, if the predetermined time period T has not elapsed, the process returns to step S5. In the example of FIG. 4B, the process returns to step S1 at time TR, and the judgment portion 13 sets the duty ratio to 100% by the processes of step S1 and S2 (D3 in FIG. 4B).

The process from step S1 to step S6 constitutes the duty ratio setting flow.

As shown in the example of FIG. 4D, the internal PWM signal G generated by the duty generating portion 14 is at the H level (duty ratio of 100%) from the time TS to the time TL. Then, during the predetermined time period T from the time TL to the time TR, the level of the internal PWM signal G repeats the H level during a period Ta and the L level during a period Tb every cycle T1 (duty ratio of 95%). Then, at the time TR, the limit signal LS is not detected because the coil current value of the motor M becomes smaller than the predetermined threshold, and the internal PWM signal G becomes an H-level signal (duty ratio of 100%).

FIGS. 4B to 4D are an operation example in which, when the predetermined time period T elapses after the duty ratio is set to the second predetermined value, the coil current value of the motor M becomes smaller than the predetermined threshold, and the duty ratio returns to the value commanded by the command signal.

Next, description will be made on an example of operation performed when the coil current value of the motor M exceeds the predetermined threshold after the predetermined time period T has elapsed.

Figure 5A:
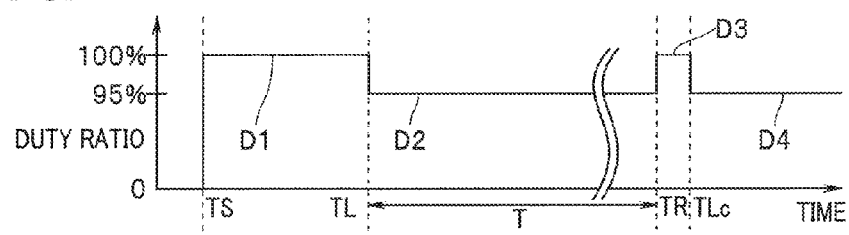
FIG. 5A is a timing chart illustrating an example of the duty ratio set by the judgment portion of the drive circuit according to the first embodiment.
Figure 5B:
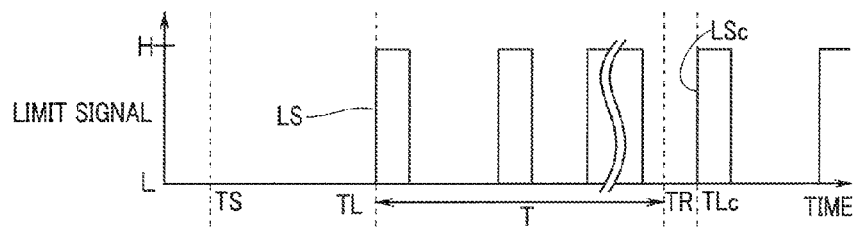
FIG. 5B is a timing chart illustrating an example of the limit signal outputted by the limit signal generating portion of the drive circuit according to the first embodiment.
Figure 5C:
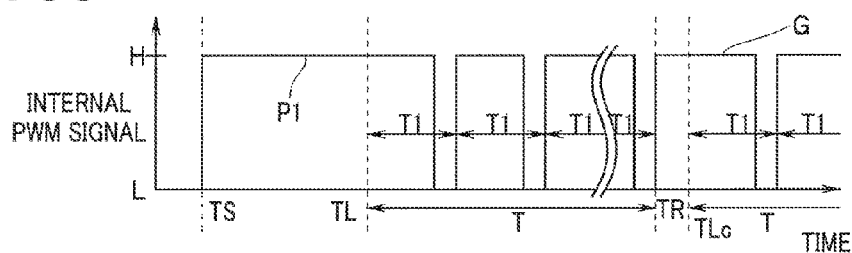
FIG. 5C is a timing chart illustrating an example of the internal PWM signal outputted by the control portion of the drive circuit according to the first embodiment.

FIG. 5A is a timing chart illustrating an example of the duty ratio set by the judgment portion 13 of the drive circuit 1 according to the first embodiment. FIG. 5B is a timing chart illustrating an example of the limit signal LS outputted by the limit signal generating portion 51 of the drive circuit 1 according to the first embodiment. FIG. 5C is a timing chart illustrating an example of the internal PWM signal G outputted by the control portion 11 of the drive circuit 1 according to the first embodiment.

As shown in the example of FIG. 5A, the judgment portion 13 causes the duty ratio to return from the second predetermined value (D2 in FIG. 5A) to the command value commanded by the command signal at the time TR (D3 in FIG. 5A).

If the coil current value of the motor M does not become smaller than the predetermined threshold even after the predetermined time period T elapses, the limit signal generating portion 51 continuously outputs a limit signal LS, which is a pulse wave, to the overload detecting portion 13b (LSc in FIG. 5B) as shown in the example of FIG. 5B.

When the limit signal LS is detected at time TLc, the judgment portion 13 sets the duty ratio to the second predetermined value during the predetermined time period T (D4 in FIG. 5A).

Thereby, the control portion 11 outputs the internal PWM signal G with the duty ratio of 95% during the predetermined time period T from the time TLc as shown in the example of FIG. 5C.

According to the first embodiment, when the duty ratio is set to a predetermined value, and the coil current of the motor M is in an overcurrent state, the drive circuit 1 drives the motor M to provide high output and causes the frequency of the internal PWM signal G to be stable so that noise and vibration can be suppressed.

(Second Embodiment)
(Configuration)

Though the control portion 11 is configured with a digital circuit in the first embodiment, the control portion 11 may be configured with an analog circuit.

Figure 6:
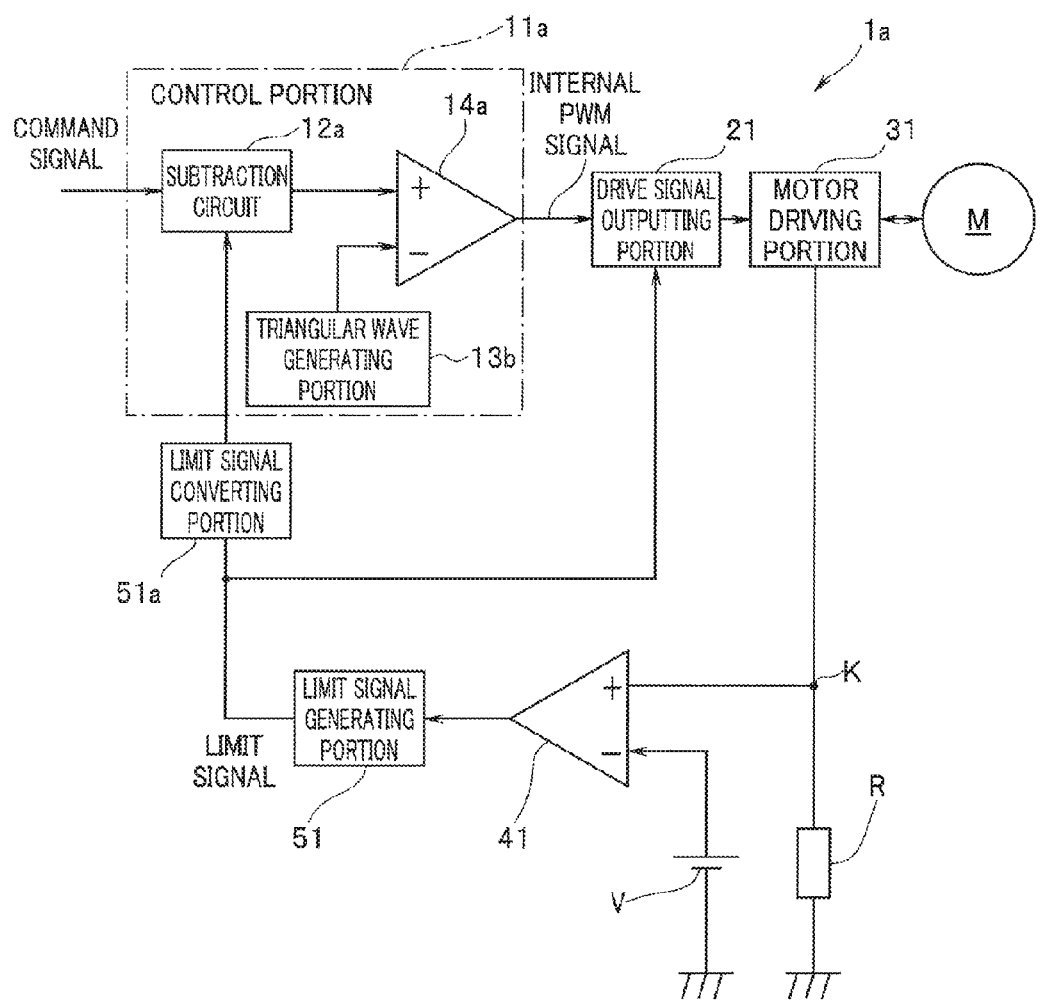
FIG. 6 is a block diagram showing a configuration of main portions of a drive circuit according to a second embodiment.

FIG. 6 is a block diagram showing a configuration of main portions of a drive circuit 1a according to a second embodiment. In description of the second embodiment, components similar to those of the first embodiment will be given same reference numerals, and description of the components will be omitted.

The drive circuit 1a is configured having a limit signal converting portion 51a and a control portion 11a.

The limit signal converting portion 51a is a circuit configured to convert a limit signal LS. For example, the limit signal converting portion 51a is configured having a charge and discharge circuit and the like. The limit signal converting portion 51a is connected to the limit signal generating portion 51 and a subtraction circuit 12a. The limit signal converting portion 51a outputs a conversion signal generated by converting a limit signal LS inputted from the limit signal generating portion 51, to the control portion 11a.

The control portion 11a has the subtraction circuit 12a, a triangular wave generating portion 13b and a comparator 14a.

The subtraction circuit 12a is a circuit configured to generate a subtraction signal WS based on a command signal and a conversion signal and output the subtraction signal WS to the comparator 14a. The subtraction circuit 12a is connected to a positive side input terminal of the comparator 14a. When a command signal with a first predetermined value is inputted by filtering, the subtraction circuit 12a subtracts a conversion signal from a command signal and outputs a subtraction signal WS to the comparator 14a.

The triangular wave generating portion 13b is a circuit configured to generate a triangular wave signal S. The triangular wave generating portion 13b is connected to a negative side input terminal of the comparator 14a. The triangular wave generating portion 13b generates a triangular wave signal S and outputs the triangular wave signal S to the comparator 14a.

The comparator 14a is a circuit configured to generate an internal PWM signal Ga and outputs the internal PWM signal Ga to the drive signal outputting portion 21. The comparator 14a is connected to the drive signal outputting portion 21. When the subtraction signal WS inputted from the positive side input terminal is higher than the triangular wave signal S inputted from the negative side input terminal, the comparator 14a outputs an internal PWM signal Ga to be of the H-level to the drive signal outputting portion 21.

In the second embodiment, a second predetermined value is defined as a function of the subtraction signal WS outputted from the subtraction circuit 12a and the triangular wave signal S outputted from the triangular wave generating portion 13b.

(Operation)

Next, operation of the drive circuit 1a according to the second embodiment will be described.

Figure 7A:
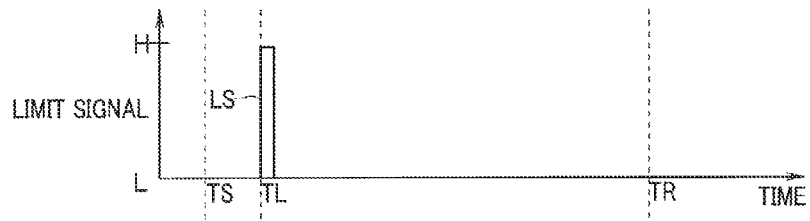
FIG. 7A is a timing chart illustrating an example of a limit signal outputted by a limit signal generating portion of the drive circuit according to the second embodiment.
Figure 7B:
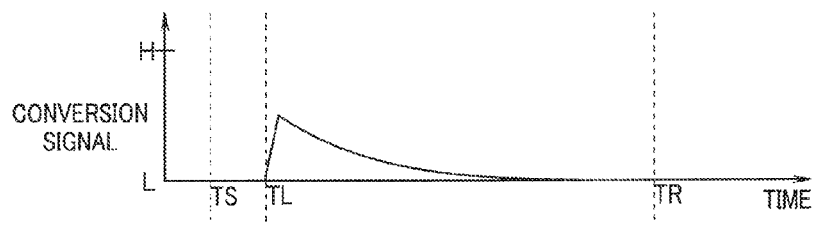
FIG. 7B is a timing chart illustrating an example of a conversion signal outputted by a limit signal converting circuit of the drive circuit according to the second embodiment.
Figure 7C:
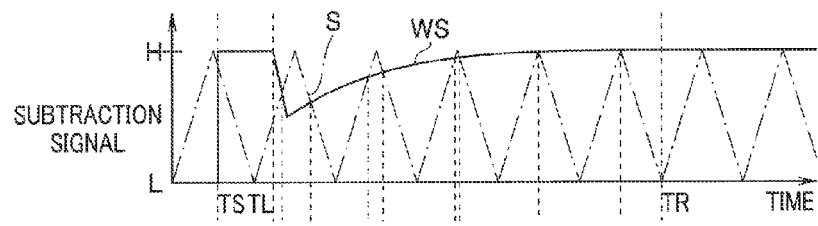
FIG. 7C is a timing chart illustrating an example of a subtraction signal and a triangular wave signal outputted by a subtraction circuit and a triangular wave generating portion of the drive circuit according to the second embodiment.
Figure 7D:
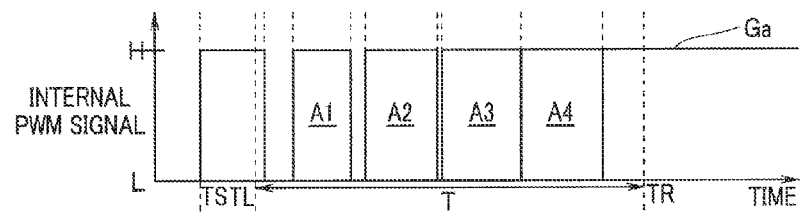
FIG. 7D is a timing chart illustrating an example of an internal PWM signal outputted by a control portion of the drive circuit according to the second embodiment.
Figure 7E:
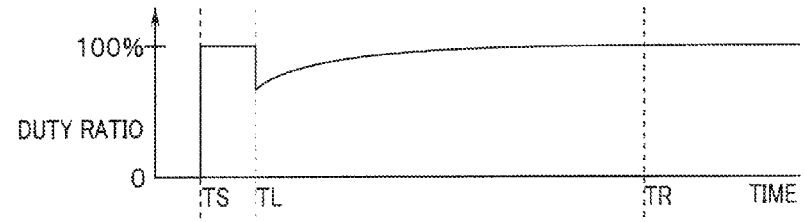
FIG. 7E is a timing chart illustrating an example of a duty ratio of the drive circuit according to the second embodiment.

FIG. 7A is a timing chart illustrating an example of the limit signal LS outputted by the limit signal generating portion 51 of the drive circuit 1a according to the second embodiment. FIG. 7B is a timing chart illustrating an example of the conversion signal outputted by the limit signal converting portion 51a of the drive circuit 1a according to the second embodiment. FIG. 7C is a timing chart illustrating an example of the subtraction signal WS and the triangular wave signal S outputted by the subtraction circuit 12a and the triangular wave generating portion 13b of the drive circuit 1a according to the second embodiment. FIG. 7D is a timing chart illustrating an example of the internal PWM signal Ga outputted by the control portion 11 of the drive circuit 1a according to the second embodiment. FIG. 7E is a timing chart illustrating an example of the duty ratio of the drive circuit 1a according to the second embodiment.

When a command signal setting and commanding a duty ratio of 100% is inputted at the time TS, the coil current of the motor M exceeds a predetermined threshold at the time TL, and the limit signal generating portion 51 outputs a limit signal LS to the limit signal converting portion 51a (FIG. 7A).

When the limit signal LS is inputted, the limit signal converting portion 51a converts the limit signal LS and outputs a conversion signal to the subtraction circuit 12a (FIG. 7B).

When the conversion signal is inputted, the subtraction circuit 12a subtracts the conversion signal from the command signal and outputs a subtraction signal WS (FIG. 7C, solid line) to the comparator 14a.

The comparator 14a generates an internal PWM signal Ga based on the subtraction signal WS inputted from the subtraction circuit 12a and the triangular wave signal S (FIG. 7C, a long dashed short dashed line) inputted from the triangular wave generating portion 13b and outputs the internal PWM signal Ga to the drive signal outputting portion 21 (FIG. 7D).

The internal PWM signal Ga is at the H level from the time TS to the time TL. Then, during the predetermined time period T from the time TL to the time TR, the duty ratio gradually increases (A1 to A4 in FIG. 7D). Then, at the time TR, the internal PWM signal Ga becomes an H-level signal.

As shown in FIG. 7E, the duty ratio of the internal PWM signal Ga is 100% until the time TL, becomes the second predetermined value defined as a function of the subtraction signal WS and the triangular wave signal S between the time TL and the time TR, and becomes 100% at the time TR.

According to the second embodiment, when the duty ratio is set to a predetermined value, and the coil current of the motor M is in an overcurrent state, the drive circuit 1a drives the motor M to provide high output and causes the frequency of the internal PWM signal Ga to be stable so that noise and vibration can be suppressed.

While certain embodiments have been described, these embodiments have been presented by way of example only, and are not intended to limit the scope of the inventions. Indeed, the novel circuits and systems described herein may be embodied in a variety of other forms; furthermore, various omissions, substitutions and changes in the form of the circuits and systems described herein may be made without departing from the spirit of the inventions. The accompanying claims and their equivalents are intended to cover such forms or modifications as would fall within the scope and spirit of the inventions.

What is claimed is:

1. A drive circuit comprising:
    a limit signal generating portion connected to a motor driving portion and configured to output a limit signal, when a motor driven by the motor driving portion comes into an overload state, and thereby a coil current value of a coil current flowing through a coil of the motor exceeds a predetermined threshold, the coil current value being inputted from the motor driving portion; and
    a control portion configured to, when a duty ratio is set to a first predetermined value, and the limit signal is inputted from the limit signal generating portion, set the duty ratio to a second predetermined value smaller than the first predetermined value during a predetermined time period, and output an internal PWM signal based on the set duty ratio, wherein
    the control portion comprises an overload detecting portion; and
    the overload detecting portion detects that an overcurrent flows through the coil of the motor based on the limit signal.

2. The drive circuit according to claim 1, comprising a drive signal outputting portion connected to the limit signal generating portion, the control portion, and the motor driving portion; wherein
    when the limit signal is inputted from the limit signal generating portion, the drive signal outputting portion lowers the duty ratio of the internal PWM signal inputted from the control portion to generate an output PWM signal, and outputs the output PWM signal to the motor driving portion.

3. The drive circuit according to claim 1, wherein
    the control portion comprises a command value setting portion; and
    the command value setting portion sets the duty ratio corresponding to a command value based on a command signal.

4. The drive circuit according to claim 1, wherein
    the control portion comprises a timer configured to start operation in response to an operation instruction and stop the operation after the predetermined time period elapses; and
    the control portion judges whether the predetermined time period elapses or not by the timer.

5. The drive circuit according to claim 4, wherein
    when the duty ratio with the first predetermined value is set by the command value setting portion, and the limit signal is detected by the overload detecting portion, and the control portion judges that an overcurrent flows through the coil of the motor, the control portion sets the duty ratio to the second predetermined value during the predetermined time period by the timer.

6. The drive circuit according to claim 1, wherein the first predetermined value is 100%.

7. The drive circuit according to claim 1, comprising a limit signal converting portion connected to the limit signal generating portion; wherein
    the limit signal converting portion comprises a charge and discharge circuit and generates a conversion signal obtained by converting the limit signal inputted from the limit signal generating portion.

8. The drive circuit according to claim 7, wherein
    the control portion comprises a subtraction circuit connected to the limit signal converting portion; and
    the subtraction circuit generates a subtraction signal based on a command signal and the conversion signal.

9. The drive circuit according to claim 8, wherein
    the control portion comprises a comparator connected to the subtraction circuit; and
    the comparator generates the internal PWM signal based on the subtraction signal inputted from the subtraction circuit and a triangular wave signal.

10. A semiconductor apparatus comprising:
    a limit signal generating portion connected to a motor driving portion and configured to output a limit signal, when a motor driven by the motor driving portion comes into an overload state, and thereby a coil current value of a coil current flowing through a coil of the motor exceeds a predetermined threshold, the coil current value being inputted from the motor driving portion; and
    a control portion configured to, when a duty ratio is set to a first predetermined value, and the limit signal is inputted from the limit signal generating portion, set the duty ratio to a second predetermined value smaller than the first predetermined value during a predetermined time period, and output an internal PWM signal based on the set duty ratio.

* * * * *